Feb. 9, 1943.　　　　G. KRYL　　　　2,310,793
AUTOMOBILE DIRECTION INDICATOR
Filed Feb. 21, 1940
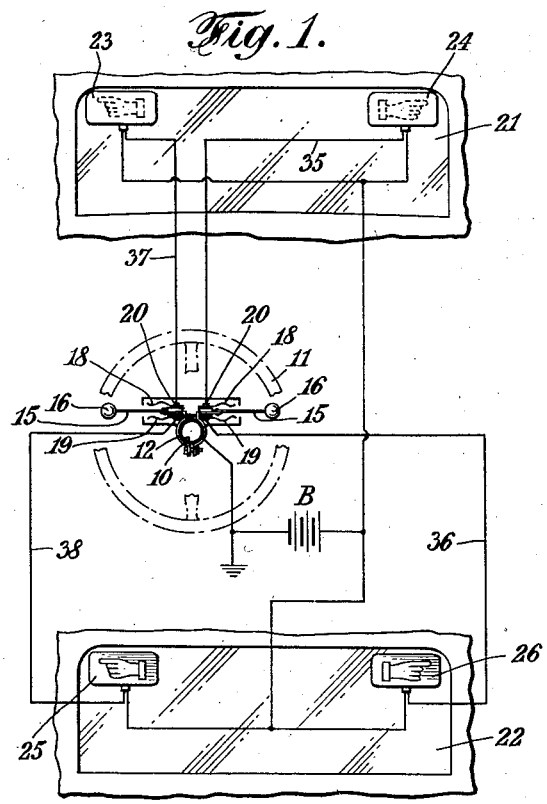
INVENTOR.
Godfried Kryl
his Attorney.

Patented Feb. 9, 1943

2,310,793

UNITED STATES PATENT OFFICE 2,310,793

AUTOMOBILE DIRECTION INDICATOR

Godfried Kryl, Inwood, N. Y., assignor of one-third to Aaron A. Mott, Cedarhurst, N. Y.

Application February 21, 1940, Serial No. 319,994

3 Claims. (Cl. 200—59)

This invention relates to signaling devices in general, and particularly to a system of directional signals for automotive vehicles.

The prime objects of the present invention are to provide a highly efficient, inexpensive, readily installable signal system, which, due to its simple arrangement, will unfailingly operate and fulfill its purpose of attracting the attention of drivers approaching or following a vehicle equipped with my system.

Signaling devices for vehicles and particularly directional signaling devices are well-known in the art. Similarly, directional devices with animated light arrangements have also been developed. Most of such devices, however, are of more or less complicated construction and therefore expensive, and require expert and costly installations. The present invention contemplates a relatively simple signaling system which may be easily installed in existing vehicles by even unskilled persons, such as the average car owner. Furthermore, the present invention is intended to enable the majority of car owners to equip their vehicles with a highly effective, dependable directional signaling system at the least possible expenditure.

The fact that an animated signaling sign, such as a direction indicator provided with a flickering light, will more readily attract the attention of observers than a steadily illuminated sign, has resulted in the construction of complicated devices with electrically operated interrupters, intended to alternately turn on and extinguish the light bulb within directional signals. Such devices are not only expensive and require expert installation and occupy a considerable space, but in addition must be carefully handled and frequently serviced. Due to the intricacy of their construction they often fail to operate and cause "shorts" in the electric system.

The present invention is very simple in construction and does not depend upon complicated electrical or mechanical interrupters. Instead it employs a simple, manually operable vibrator which, when actuated, will alternately make and break in rapid succession electric circuits controlling the light sources of the signaling devices, thereby producing a flickering of these sources and attracting the attention of observers.

The foregoing objects and other advantages of my invention will become more fully apparent from the ensuing description of the accompanying drawing, which latter shows presently preferred forms of my invention, and in which:

Fig. 1 is a diagram of a system of directional signals with their electrical connections controlled by my manually operated vibratory interrupter.

Fig. 2 is a detail view of my interrupter.

Fig. 3 is an elevation of a signal box.

Fig. 4 is an enlarged cross section therethrough taken on lines 4—4 of Figure 3.

Fig. 5 is a perspective view of a modified form of my signal box, and

Fig. 6 is a diagram illustrating the employment of my interrupter in connection with the usual and additional safety signal signs for automobiles.

Referring now specifically to the figures, numeral 10 denotes the steering column or steering post of a vehicle, on top of which is mounted a steering wheel 11, indicated in broken lines. Secured to the steering post and below wheel 11 is a clamp 12, clearly seen in Figure 2, which is provided with a pair of spaced brackets 13 and to which brackets are secured at 14 resilient blades 15, provided at their free or exterior ends with handles or balls 16. These balls constitute weights for blades 15 and serve not only to facilitate the actuation of the blades, but also to prolong their vibration when touched by the operator. The operation of the blades is best indicated in broken lines at the right hand side of Figure 2.

Secured to brackets 13, and electrically insulated from the latter by suitable dielectric material indicated at 17, are contacts 18 and 19, held in place by bolts 20 or by any other suitable means. Contacts 18 and 19 are in the form of relatively stiff, but still resilient, spaced tangs or clips, which are intended to be alternately contacted by resilient blades 15 when the latter are caused to vibrate by touching balls 16.

Referring to Fig. 1, there is shown at 21 a windshield of a vehicle, while numeral 22 designates the rear window thereof. Attached to the windshield are left and right direction indicator signs 23 and 24, while at the rear window corresponding left and right direction indicator signs 25 and 26 are illustrated. These signs, such as shown in detail in Figures 3, 4 and 5, are preferably constructed in the form of closed, boxlike casings 27, made of metal or other suitable material, and are provided with a transparent shield 28 bearing a direction indicator in the shape of either an arrow or a hand with the index finger pointing to the left or right.

Secured within the casing is a socket 29 for accommodating a bulb 30. Socket 29 is removable from the casing so that bulb 30 may be readily changed, while the casing remains in place. The open edge of the casing is equipped with a rubber rim 31 provided with depressions 32, which latter are intended to form vacuum chambers for holding the casing against a smooth surface. The interior edge 33 of rubber rim 31 serves to hold transparent sign 28 against ledge 34 provided in the casing.

The electric connections of the device are extremely simple. Clamp 12 being mounted directly on the steering post 10 is grounded, and is connected with one terminal of battery B. Since vibrator blades 15 are directly secured to clamp 12, they are also grounded. The right-hand clips 18 and 19 are connected with the bulbs of right-hand direction indicators 24 and 26 by leads 35 and 36, respectively, while the left-hand clips 18 and 19 are connected with the bulbs of left-hand indicators 23 and 25 by wires 37 and 38. From all bulbs suitable leads are directed to the other terminal of battery B.

*Operation*

When the driver of a vehicle intends to turn to the right or left, he will touch either the right or left ball 16 of the vibrator blade and thus cause it to oscillate and alternately touch and swing away from contacts 18 and 19 in very rapid succession. This operation will cause the bulbs in the directional signs to flicker until the vibrator blade comes to a standstill.

Under ordinary driving conditions blades 15 assume what may be termed their neutral or normal position, that is a position at which the vibrators are equally spaced from contacts 18 and 19. Only when balls 16 are touched the vibrators will operate.

*Additional structure*

While contacts 18 and 19 and the vibrators may be mounted without having any exterior protection, I prefer to encase the mechanism within a box-like compartment, such as clearly indicated at 39 in Figure 2. The shape of the compartment may vary in size or arrangement, since it merely serves to protect the different parts within from becoming inadvertently dislodged.

In Figure 5 I have illustrated a modified form of my directional sign, wherein again a box-like structure 40 is employed, from which extend brackets 41 or any other means for accommodating suction or vacuum cups 42, whereby the sign may be conveniently secured to the glass of the windshield or rear window.

Another embodiment of my device is shown in Figure 6, where, in addition to the pair of contacts and vibrators illustrated in Figure 1, two other sets of vibratory interrupters are employed. The left-hand interrupter 43 is intended for energizing a stop signal, while the right-hand interrupter 44 controls the operation of a signal for indicating the intention of the driver to back up his vehicle. The operation and arrangement of these two additional signalling systems is the same as that described in Figures 1 and 2.

All of the vibratory interrupters are intended to intermittently energize signals, arranged either in pairs, such as front and rear left signals, or single signal units similar to those shown in Figure 6. In all devices the vibratory element 15 is actuated manually and is placed so that it will normally remain spaced midway between the two contacts 18 and 19, until actuated by touching its weighted end.

While I have shown in the drawing specific forms of my device, it is quite evident that the same ultimate effects intended for my device may be produced with instrumentalities differing in structural details from that illustrated. It is also reasonable to assume that in the course of manufacture of my device changes, improvements, simplifications and variations may be desirable in order to adapt my invention for different uses in connection with different vehicles or similar devices, and I therefore reserve for myself the right to make changes and improvements therein, but without departing from the underlying principles of my invention of employing manually operable, vibratory interrupters secured within ready reach of the operator of a vehicle and preferably located at the steering column and below the steering wheel of the vehicle. By the same token I shall not be restricted to the use of indicator signs of the constructions illustrated.

I claim:

1. In a switch for controlling direction indicating and similar signals in vehicles or the like and adapted to be mounted upon the steering column and beneath the steering wheel, a clamp comprising two spaced brackets with at least two extensions arranged in opposite directions away from the steering column, resilient blades secured at the ends of said extensions, weighted handles at the ends of the blades, a pair of spaced, resilient contact tangs secured to and insulated from each of said extensions, the tangs of each pair being disposed at both sides of and being normally spaced from said blades, the latter being adapted to alternately touch and swing away from their respective tangs when caused to vibrate in response to a vigorous deflection imparted to the blades by way of said weighted handles.

2. In a switch for the purpose described, a securing clamp adapted to be associated with the steering post and beneath the steering wheel of a vehicle or the like, at least two oppositely disposed, outwardly directed conductive members extending from the clamp, each member supporting a highly resilient vibratory element provided with a weighted handle at the free end thereof, a pair of spaced, resilient tangs secured to and insulated from each of said members, the ends of the tangs being normally disposed at both sides of their respective vibratory elements and being spaced therefrom, and means for electrically and mechanically connecting each pair of tangs.

3. In a switch, as set forth in claim 2, and a housing for accommodating said tangs and the supported ends of the vibratory elements.

GODFRIED KRYL.